US00RE40108E

(19) United States
(12) Reissued Patent
Kuo

(10) Patent Number: US RE40,108 E
(45) Date of Reissued Patent: Feb. 26, 2008

(54) EYEGLASSES CONVERTIBLE INTO AN EYEGLASS CASE

(75) Inventor: Shui-Hua Kuo, Tainan (TW)

(73) Assignee: Contour Optik, Inc., Chiayi (TW)

(21) Appl. No.: 10/219,365

(22) Filed: Aug. 14, 2002

Related U.S. Patent Documents

Reissue of:
(64) Patent No.: 6,102,541
Issued: Aug. 15, 2000
Appl. No.: 09/280,573
Filed: Mar. 30, 1999

(51) Int. Cl.
*G02C 5/08* (2006.01)

(52) U.S. Cl. ..... 351/63; 351/41; 2/454; 206/5

(58) Field of Classification Search ..... 351/63, 351/41, 111, 115, 153; 2/454; 16/228; 206/5
See application file for complete search history.

(56) References Cited

U.S. PATENT DOCUMENTS

| | | | | |
|---|---|---|---|---|
| 2,166,110 A | | 7/1939 | Baldanza | |
| 2,275,999 A | | 3/1942 | Strauss | |
| 2,307,419 A | | 1/1943 | McNeill et al. | |
| 2,537,248 A | | 1/1951 | Vigano | |
| 3,049,974 A | | 8/1962 | Miwa | |
| 3,361,515 A | * | 1/1968 | Vanderbeek | 351/121 |
| 4,610,519 A | | 9/1986 | Hyman | |
| 4,720,186 A | | 1/1988 | Douillard | |
| 4,887,896 A | | 12/1989 | Akagi | 351/63 |
| 5,187,504 A | | 2/1993 | Kanda | |
| 5,208,616 A | | 5/1993 | Chang | |
| 5,448,317 A | | 9/1995 | Huang | 351/63 |
| 5,532,766 A | | 7/1996 | Mateer et al. | |
| 5,576,776 A | | 11/1996 | Scheller | |
| 5,638,146 A | | 6/1997 | Nannini | |
| 5,640,218 A | | 6/1997 | Kanda | 351/63 |
| 5,896,185 A | | 4/1999 | Huang | |
| 5,929,966 A | | 7/1999 | Conner | |
| 6,048,062 A | | 4/2000 | Chow | |
| 6,102,541 A | | 8/2000 | Kuo | |
| 6,257,720 B1 | | 7/2001 | Ozawa | |

FOREIGN PATENT DOCUMENTS

| | | |
|---|---|---|
| EP | 0 512 173 A1 | 11/1992 |
| EP | 0 515 826 A1 | 12/1992 |
| JP | 63307425 | 12/1988 |
| WO | WO 89/06822 | 7/1989 |

OTHER PUBLICATIONS

International–Search Report, Apr. 10,1989.

* cited by examiner

*Primary Examiner*—Hung Xuan Dang
(74) *Attorney, Agent, or Firm*—Greenberg Traurig, LLP

(57) ABSTRACT

Eyeglasses convertible into an eyeglass case, including a frame, seats, rotary blocks, upper and lower covers, and hinges. The frame has lenses and a larger nose pad at the center. The seats are provided on both ends of the frame and have upper and lower grooves on one side, with a screw hole disposed intermediate of the upper and lower grooves. The rotary blocks have a projection and can turn about an angle of 180 degrees in the seats. The rotary blocks further have a recess on one side with a through hole for receiving a screw rod, whereby the hinge is pivotally secured in the recess. The hinges are provided at front ends of the upper and lower covers that serve as casings of the eyeglass case or earpieces of the eyeglasses.

15 Claims, 5 Drawing Sheets

EYEGLASSES CONVERTIBLE INTO AN EYEGLASS CASE

Matter enclosed in heavy brackets [ ] appears in the original patent but forms no part of this reissue specification; matter printed in italics indicates the additions made by reissue.

BACKGROUND OF THE INVENTION (a) Field of the Invention

The present invention relates to a structure of eyeglasses, more particularly to a pair of eyeglasses that is convertible into a case for keeping the eyeglasses so as to facilitate carding and prevent possible loss thereof.

(b) Description of the Prior Art

Reference is made to FIG. 1, which shows the prior art. A case 1 is provided for keeping a conventional pair of eyeglasses 12. The case 1 has a fastening hook 11 on one side for attaching the case to a pocket or the like. As the eyeglasses 12 and the case 1 are two separate articles, the eyeglasses 12 have to be taken out from the case 1 for use or put back thereinto for keeping purposes when not in use. Besides, earpieces 121 of the eyeglasses 12 have to be extended, or opened so that they can be worn on the user's face. Besides, if the eyeglasses 12 are lost or broken, the case 1 may become useless since it may not match other sizes of eyeglasses.

SUMMARY OF THE INVENTION

The present invention relates to a structure of eyeglasses, more particularly to a pair of eyeglasses that is convertible into a case for keeping the eyeglasses so as to facilitate carrying and prevent possible loss thereof.

A primary object of the present invention is to provide a pair of eyeglasses that is convertible into an eyeglass case to facilitate carrying and use.

Accordingly, a preferred embodiment of the present invention includes a frame, seats, rotary blocks, upper and lower covers, and hinges. The frame has lenses and a larger nose pad at the center to prevent slippage. The seats are provided on both ends of the frame and have upper and lower grooves on one side, with a screw hole disposed intermediate of the upper and lower grooves. The rotary blocks have a projection and can turn about an angle of 180 degrees in the seats. The rotary blocks further have a recess on one side with a through hole for receiving a screw rod, whereby the hinge is pivotally secured in the recess. The hinges are provided at front ends of the upper and lower covers that serve as casings of the eyeglass case or earpieces of the eyeglasses.

DETAILED DESCRIPTION OF THE PREFERRED EMBODIMENT

Figure 1:
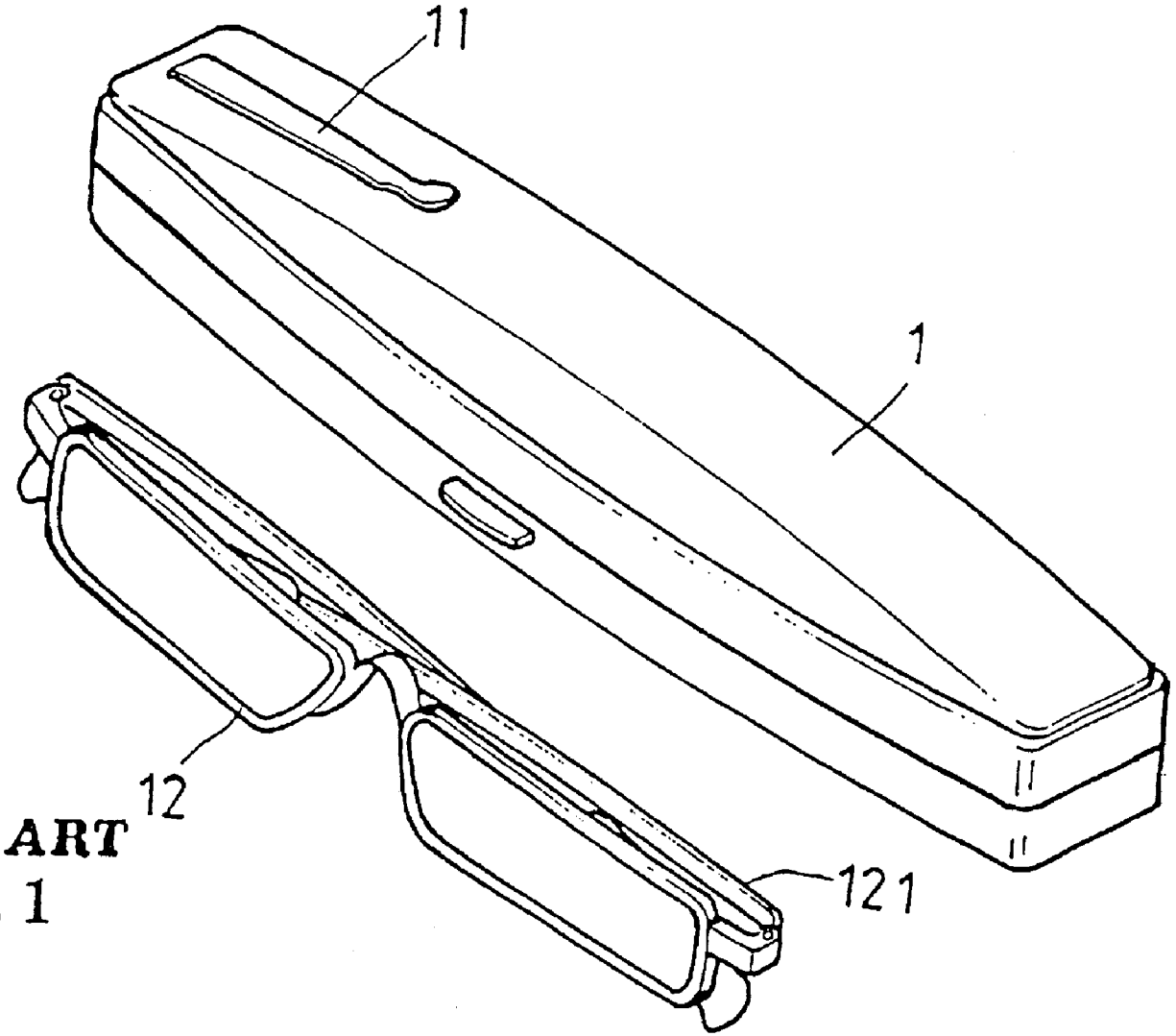
PRIOR ART FIG. 1
FIG. 1 is a perspective view of the prior art.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
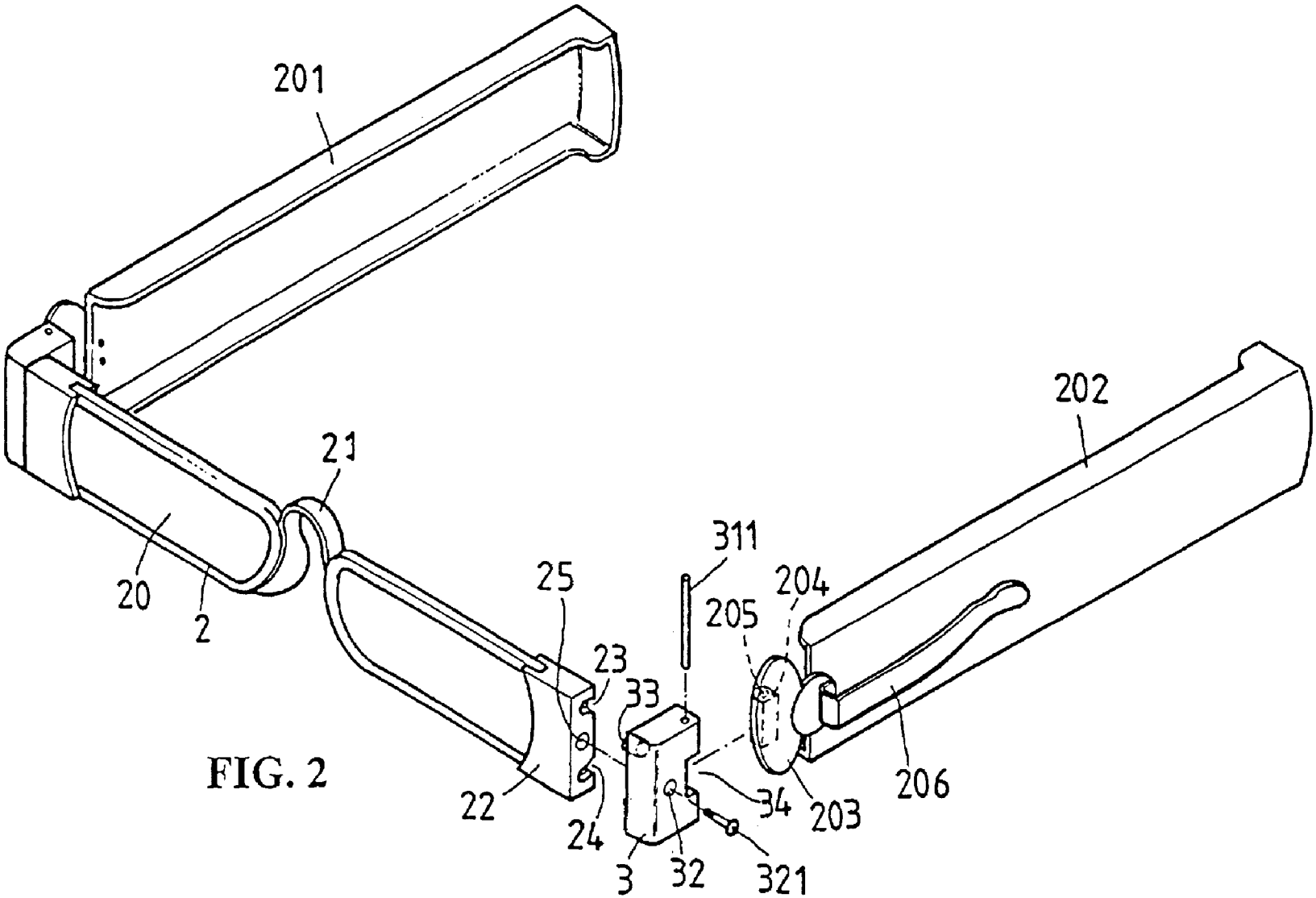
FIG. 2 is an exploded perspective view of the present invention.

With reference to FIG. 2, the present invention is shown to comprise a frame 2, two seats 22, two rotary blocks 3, an upper cover 202, a lower cover 201, and two hinges 203. The frame 2 includes lenses 20, left and right portions, and a larger nose pad 21 at the center between the left and right portions, adapted to provide a stable and elastic support and durability, and to prevent slippage. The seats 22 are provided at both ends of the frame 2, respectively. Each of the seats 22 includes upper and lower grooves 23, 24 on one side, with a screw hole 25 at the center. The seats 22 are provided to allow rotation of the rotary blocks 3. Each of the rotary blocks 3 is provided with a central screw hole 32 for passage of a screw 321. The screw 321 passes through the central through hole 32 to be locked in the screw hole 25 of the seat 22. In order that the rotary block can rotate about an angle of 180 degrees, it has a projection 33 at one corner for matching and engaging the upper or lower groove 23,24. When the rotary block 3 rotates, the projection 33 can slidably displace from the upper groove 23 to the lower groove 24, or vice versa. Furthermore, in order to cooperate with the path of rotation of the rotary blocks 3, the upper and lower grooves 23, 24 of the seats 22 have openings configured to be curved. Each rotary block 3 is further provided with a recess 34 on one side, which has a longitudinally oriented through screwhole 31 for passage of a screw rod 311. The upper and lower covers 202, 201 are adapted to be casings and earpieces of the eyeglasses of the present invention. Insert posts 204 are provided on inner sides of front ends of the upper and lower covers 202, 201 and are each centrally provided with a through hole 205 for passage of the screw rod 311. The screw rods 311 secure the insert posts 204 of the hinges 203 at the front ends of the upper and lower covers 202, 201 in the recesses 34 of the rotary blocks 3 so that the upper and lower covers 202,201 can rotate about an angle of 90 degrees with respect to the rotary blocks 3. Furthermore, the upper cover 202 is provided with a fastening hook 206 on an outer side thereof for attaching the eyeglasses to a pocket or the like.

Figures 3, 3A:
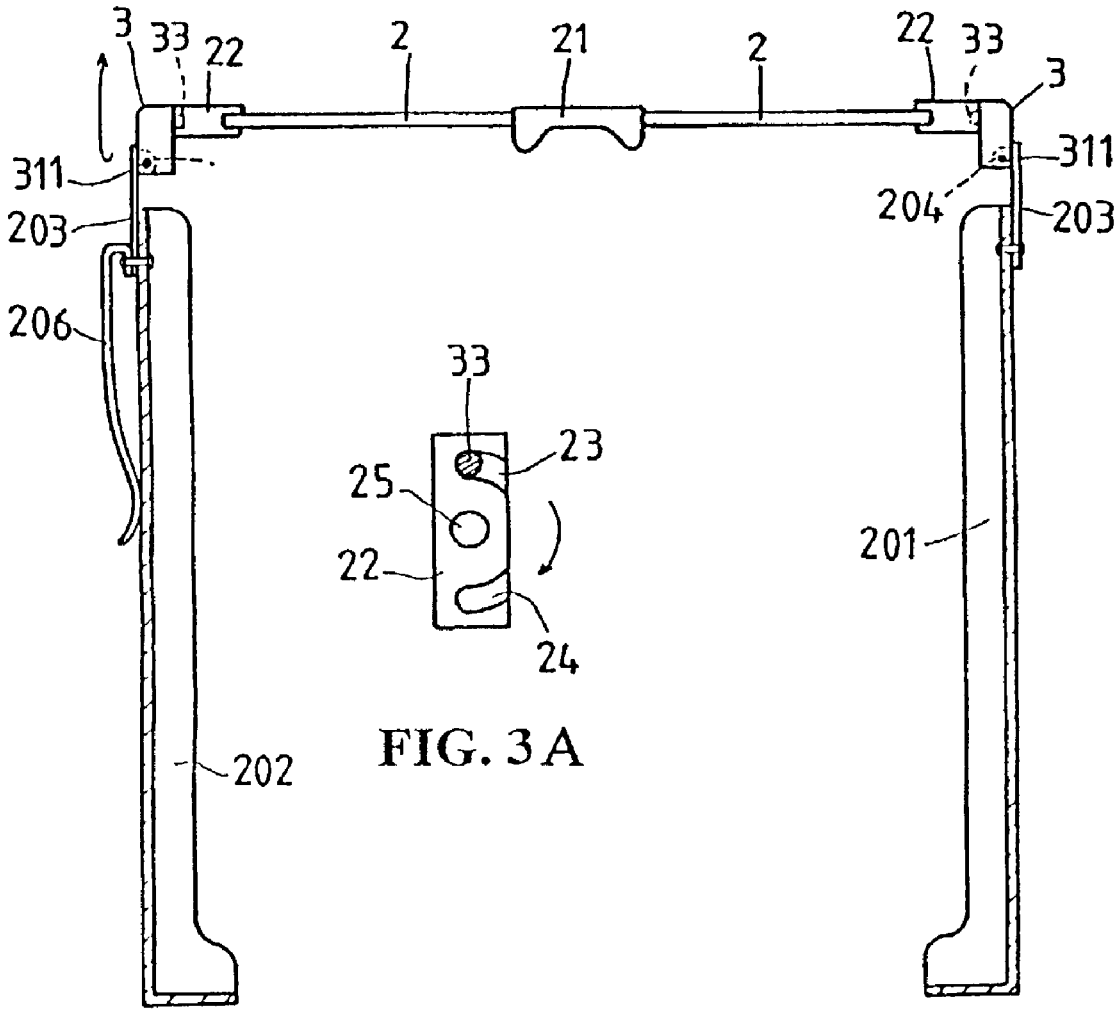
FIG. 3 is a cross-sectional view of the present invention when used as eyeglasses.
FIG. 3A is a schematic view illustrating displacement of a projection with respect to upper and lower grooves of a seat of the present invention.
Figures 4, 4A:
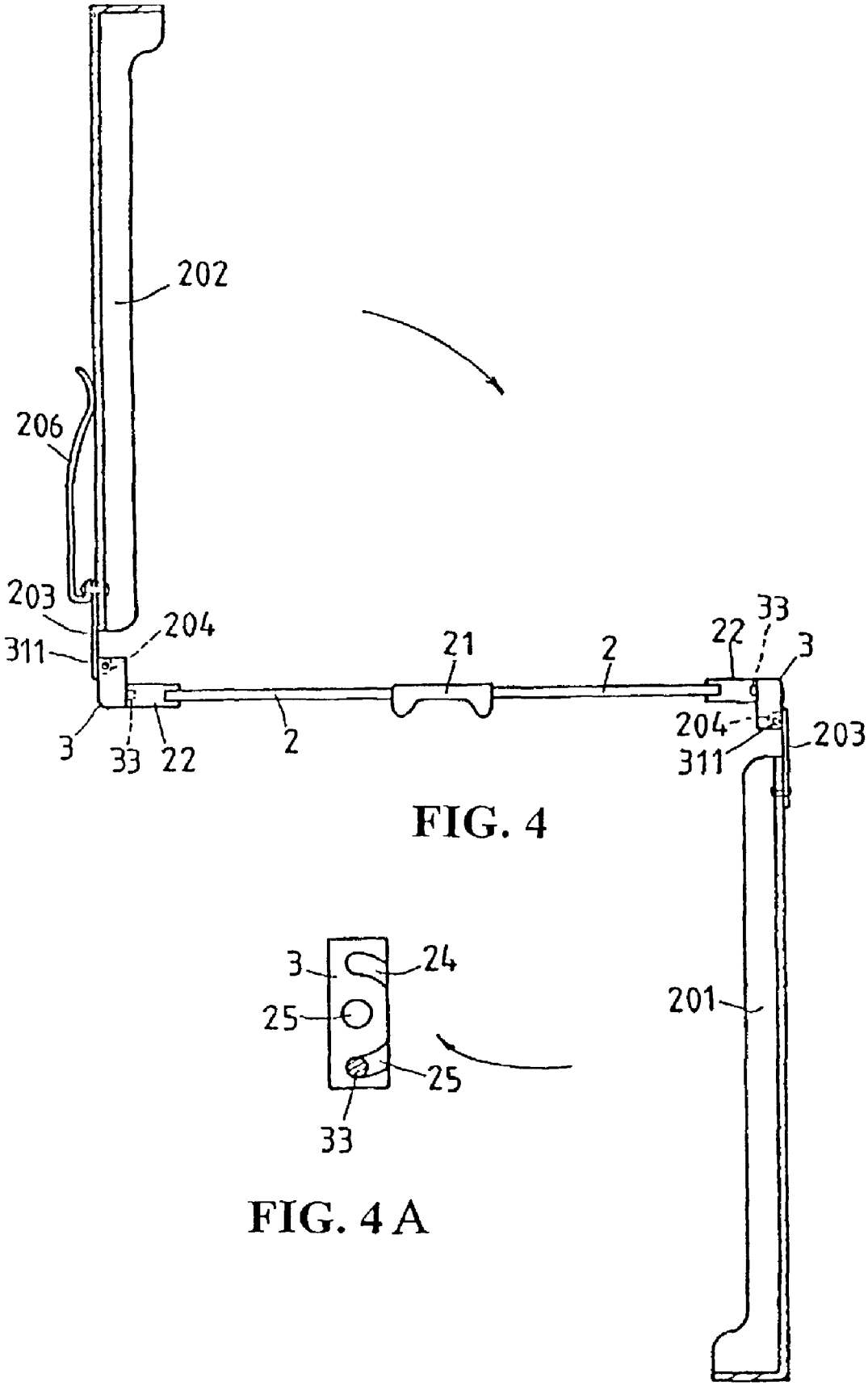
FIG. 4 is a schematic view illustrating the pivotal tuning of the present invention.
FIG. 4A is another schematic view illustrating displacement of the projection with respect to the upper and lower grooves.
Figure 5:
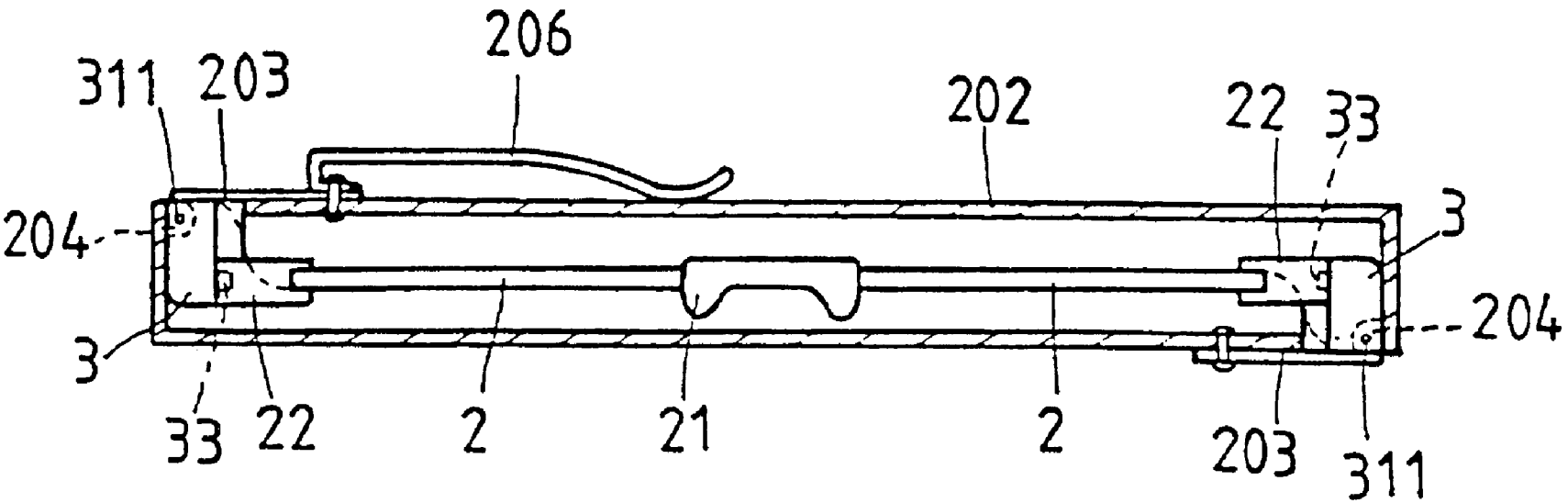
FIG. 5 is a sectional view of the present invention in a closed state as an eyeglass case.

FIG. 3 shows the eyeglasses of the present invention in an opened state of use and FIG. 3A is a schematic view illustrating displacement of a projection with respect to upper and lower grooves of a seat of the present invention. Referring to FIGS. 4 and 5, when it is desired to convert the eyeglasses of the present invention into a case, it is only necessary to turn the upper cover 202 along with the hinge 203 and the rotary block 3 connected thereto about an angle of 180 degrees, using the screw rod 321 as an axis. At this point, the projection 33 on the rotary block 3 will displace from the upper groove 23 to the lower groove 24 of the seat 22 and be positioned (see FIG. 4A), so that the shape of the frame 2, the upper cover 202 with the fastening hook 26, and the lower cover 201 resembles the letter "N". Then, the upper and lower covers 202, 201 turn about an angle of 90 degrees by means of the insert posts 204 of the hinges 203 that pivotally tun within the recesses 34 on one side of the rotary blocks 3 using the screw rods 311 as an axis. At this time, the upper and lower covers 202, 201 are brought to rest against front and rear sides of the frame 2, respectively, to envelop the same, as shown in FIG. 5. It can therefore be seen that the eyeglasses of the present invention are convenient to carry. If it is desired to resume the original shape of the eyeglasses, it is only necessary to turn the upper and lower covers in the opposite directions. Certainly, it should be understood that the upper and lower covers 202, 201 can be pivotally connected to the frame 2 to allow turning thereof by other means as that exemplified above.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. Eyeglasses convertible into an eyeglass case, comprising a frame, seats, rotary blocks, an upper cover, a lower cover, and hinge means, said frame having lenses and a [larger] nose pad at the center, [said upper cover having a fastening hook on an outer side for attaching said eyeglasses to a pocket or the like,] wherein said seats are provided at both ends of said frame, respectively, said seats including upper and lower grooves on one side, with a screw hole at the center, said upper and lower grooves each having a curved opening, said rotary blocks being each provided on one side of a respective one of said seats and being formed with a central screw hole for passage of a screw that passes through said central screw hole into said screw hole of a respective one of said seats, each of said rotary blocks having a projection on one side that is insertable into said upper or lower groove and can turn about an angle of 180 degrees with respect thereto, and a recess on the other side in the center, said recess being formed with a longitudinally oriented through screw hole for passage of a screw rod, said upper and lower covers being adapted to be earpieces of said frame, said hinge means being provided at front ends of said upper and lower covers, respectively, each of said hinge means having an insert post on an inner side thereof, said insert post having a through hole and being disposed in said recess of a respective one of said rotary blocks such that it can turn about an angle of 90 degrees using said screw rod as an axis, rotation of said rotary blocks permitting pivotal turning of said upper and lower covers so that said upper and lower covers can be closed towards front and rear sides of said frame to convert said eyeglasses into an eyeglass case or away therefrom in an extended state of use.

*2. The eyeglasses of claim 1 further comprised of a fastening hook on an outer side of the upper cover for attaching the eyeglasses to a pocket or the like.*

*3. Eyeglasses provided with at least one arm rotatable from a first position behind a lens retaining portion to a second position where the arm is in front of the lens retaining portion, comprised of: an eyeglass frame having a lens retaining portion for retaining a pair of lenses joined at opposite sides thereof to a first arm and a second arm, wherein the first and second arms are provided with hinges that allow the first and second arms to be moved around a respective axis of rotation into a position substantially perpendicular to the lens retaining portion, wherein at least the first arm is rotatable around a second axis of rotation which forms an angle to the axis of rotation of its respective hinge from a position in which the arm is behind the lens retaining portion to a position in front of the lens retaining portion, wherein the first arm and lens retaining portion are respectively joined at a pivot forming the second axis of rotation, the pivot defining a path that the rotatable arm travels in rotating from a position behind the lens retaining portion to a position in front of the lens retaining portion, wherein the path is further defined by a stop positioned to prohibit further rotation of the arm once the arm has been positioned in front of the lens retaining portion.*

*4. The eyeglasses of claim 3 wherein the pivot is comprised of a seat affixed to a first side of the lens retaining portion and a rotary block affixed to the first arm, the seat including a path having an upper arcuate groove and a lower arcuate groove, the seat further provided with a central screw hole, the rotary block being provided on one side of the seat and being formed with a screw hole for passage of a screw that passes through said screw hole into said screw hole of the seat, the rotary block having a projection on a seat facing side that is positioned to reside within the upper groove or lower groove, and can rotate with respect thereto, rotation of said rotary block permitting pivotal turning of said first arm around the second axis of rotation.*

*5. The eyeglasses of claim 4 wherein the stop is an end wall of at least one of the upper groove or lower groove.*

*6. The eyeglasses of claim 4 wherein the stop is an end wall of the upper groove and lower groove.*

*7. Eyeglasses provided with at least one arm rotatable from a first position behind a lens retaining portion to a second position where the arm is in front of the lens retaining portion, comprised of: an eyeglass frame having a lens retaining portion for retaining a pair of lenses joined at opposite sides thereof to a first arm and a second arm, wherein the first and second arms are provided with hinges that allow the first and second arms to be moved around a respective axis of rotation into a position substantially perpendicular to the lens retaining portion, wherein at least the first arm is rotatable around a second axis of rotation which forms an angle to the axis of rotation of its respective hinge from a position in which the arm is behind the lens retaining portion to a position in front of the lens retaining portion, wherein the first arm and lens retaining portion are respectively joined at a pivot forming the second axis of rotation, the pivot defining a path that the rotatable arm travels in rotating from a position behind the lens retaining portion to a position in front of the lens retaining portion, wherein the path is further defined by stops positioned to limit rotation of the arm to substantially 180° between the position behind the lens retaining portion to the position in front of the lens retaining portion.*

*8. The eyeglasses of claim 7 wherein the pivot is comprised of a seat affixed to a first side of the lens retaining portion and a rotary block affixed to the first arm, the seat including a path having an upper arcuate groove and a lower arcuate groove, the seat further provided with a central screw hole, the rotary block being provided on one side of the seat and being formed with a screw hole for passage of a screw that passes through said screw hole into said screw hole of the seat, the rotary block having a projection on a seat facing side that is positioned to reside*

*within the upper groove or lower groove, and can turn about an angle of 180 degrees with respect thereto, rotation of said rotary block permitting pivotal turning of said first arm.*

*9. The eyeglasses of claim 8 wherein the stops are end walls of the upper groove and the lower groove.*

*10. Eyeglasses provided with at least one cover rotatable from a first position behind a lens retaining portion to a second position where the cover is in front of the lens retaining portion, comprised of: an eyeglass frame having a lens retaining portion for retaining a pair of lenses joined at opposite sides thereof to a first cover and a second cover, wherein the first and second covers are provided with hinges that allow the first and second covers to be moved around a respective axis of rotation into a position substantially perpendicular to the lens retaining portion, wherein at least the first cover is rotatable around a second axis of rotation which forms an angle to the axis of rotation of its respective hinge from a position in which the cover is behind the lens retaining portion to a position in front of the lens retaining portion, wherein the first cover and lens retaining portion are respectively joined at a pivot forming the second axis of rotation, the pivot defining a path that the rotatable cover travels in rotating from a position behind the lens retaining portion to a position in front of the lens retaining portion, wherein the path includes a stop positioned to prohibit further rotation of the cover once the cover has been positioned in front of the lens retaining portion.*

*11. The eyeglasses of claim 10 wherein the pivot is comprised of a seat affixed to a first side of the lens retaining portion and a rotary block affixed to the first cover, the seat including a path having an upper arcuate groove and a lower arcuate groove, the seat further provided with a central screw hole, the rotary block being provided on one side of the seat and being formed with a screw hole for passage of a screw that passes through said screw hole into said screw hole of the seat, the rotary block having a projection on a seat facing side that is positioned to reside within the upper groove or lower groove, and rotate with respect thereto, rotation of the rotary block permitting pivotal turning of the first cover around the second axis of rotation.*

*12. The eyeglasses of claim 11 further comprised of a stop that is the end wall of at least one of the upper groove or lower groove.*

*13. Eyeglasses provided with at least one arm rotatable from a first position behind a lens retaining portion to a second position where the arm is in front of the lens retaining portion, comprised of: an eyeglass frame having a lens retaining portion for retaining a pair of lenses joined at opposite sides thereof to a first arm and a second arm, wherein the first and second arms are provided with hinges that allow the first and second arms to be moved around a respective axis of rotation into a position substantially perpendicular to the lens retaining portion, wherein at least the first arm is rotatable around a second axis of rotation which forms an angle to the axis of rotation of its respective hinge from a position in which the arm is behind the lens retaining portion to a position in front of the lens retaining portion, wherein the first arm and lens retaining portion are respectively joined at a pivot forming the second axis of rotation, the pivot comprising a guide piece and a path traveled by the guide piece, wherein the guide piece is sized to be displaceable along the path and the displacement thereof in the path defines the rotation of the first arm from a position behind the lens retaining portion to a position in front of the lens retaining portion.*

*14. The eyeglasses of claim 13 wherein the pivot is comprised of a seat affixed to a first side of the lens retaining portion and a rotary block affixed to the first arm, the seat including a path having an upper arcuate groove and a lower arcuate groove, the seat further provided with a central screw hole, the rotary block being provided on one side of the seat and being formed with a screw hole for passage of a screw that passes through said screw hole into said screw hole of the seat, the rotary block having a projection on a seat facing side that is positioned to reside within the upper groove or lower groove, and rotate with respect thereto, rotation of said rotary block permitting pivotal turning of said first arm around the second axis of rotation.*

*15. The eyeglasses of claim 14 wherein the stop is the end wall of at least one of the upper groove or lower groove.*

* * * * *